(12) United States Patent
Jejcic

(10) Patent No.: US 8,038,339 B2
(45) Date of Patent: Oct. 18, 2011

(54) MIXING MEMBER FOR BLENDERS

(75) Inventor: Valter Jejcic, Nova Gorica (SI)

(73) Assignee: Valmar Global VSE Za Sladoled D.O.O., Volcja Draga (SI)

( * ) Notice: Subject to any disclaimer, the term of this patent is extended or adjusted under 35 U.S.C. 154(b) by 844 days.

(21) Appl. No.: 11/601,091

(22) Filed: Nov. 17, 2006

(65) Prior Publication Data

US 2007/0140053 A1    Jun. 21, 2007

(30) Foreign Application Priority Data

Nov. 18, 2005  (IT) .............................. TO2005A0813

(51) Int. Cl.
*B01F 7/04* (2006.01)
*A23G 9/12* (2006.01)
(52) U.S. Cl. .................... 366/311; 366/313; 366/325.94
(58) Field of Classification Search ................. 15/249.2, 15/249.3, 250.47, 256.53; 366/67, 311–313, 366/309, 310, 325.92, 325.94, 326.1, 328.1; 62/342–343; 109/94, 109.1
See application file for complete search history.

(56) References Cited

U.S. PATENT DOCUMENTS

| | | | | |
|---|---|---|---|---|
| 48,156 A | * | 6/1865 | Colby | 366/313 |
| 172,475 A | * | 1/1876 | Packer | 366/311 |
| 183,046 A | * | 10/1876 | Dunbar | 366/311 |
| 313,760 A | * | 3/1885 | Packer | 366/343 |
| 864,632 A | * | 8/1907 | Fegley | 366/311 |
| 969,016 A | * | 8/1910 | Willmann | 366/311 |
| 986,257 A | * | 3/1911 | Willmann | 165/66 |
| 1,215,526 A | * | 2/1917 | Hansen | 366/311 |
| 1,508,031 A | * | 9/1924 | Simpson | 241/124 |
| 1,880,731 A | * | 10/1932 | Boileau | 366/288 |
| 2,211,387 A | * | 8/1940 | Routh | 62/69 |
| 2,295,136 A | * | 9/1942 | Stiers | 366/98 |
| 2,470,691 A | * | 5/1949 | Erickson et al. | 366/311 |

(Continued)

FOREIGN PATENT DOCUMENTS

DE          2405224     * 8/1974

(Continued)

OTHER PUBLICATIONS

Machine translation (EPO) of DE 4426589 A1, generated Feb. 11, 2009.*

(Continued)

*Primary Examiner* — Charles E Cooley
(74) *Attorney, Agent, or Firm* — Robert P. Lenart, Esq.; Pietragallo Gordon Alfano Bosick & Raspanti, LLP

(57) ABSTRACT

A mixing member designed for assembly in an axially rotating manner inside the cylindrical bowl of a blender; the mixing member having a number of longitudinal blades extending parallel to a longitudinal reference axis of the mixing member and spaced angularly about the longitudinal axis to form a "squirrel cage" structure bounded laterally by a cylindrical reference surface coaxial with the longitudinal axis; each of the longitudinal blades has an outer lateral edge lying on the cylindrical reference surface and having at least one scraping device, which includes a scraper hinged to the body of the longitudinal blade to project from and rotate about an axis of rotation locally substantially parallel to the outer lateral edge of the longitudinal blade and/or to the longitudinal axis of the mixing member, and an elastic member which pushes a wedge-shaped transverse edge of the scraper radially onto the cylindrical inner surface of the bowl.

10 Claims, 2 Drawing Sheets

U.S. PATENT DOCUMENTS

| | | | |
|---|---|---|---|
| 2,526,367 A * | 10/1950 | Kaltenbach et al. | 416/219 R |
| 2,538,716 A * | 1/1951 | Wakeman | 366/309 |
| 2,810,557 A * | 10/1957 | Phelan | 366/311 |
| 2,836,401 A * | 5/1958 | Phelan | 366/311 |
| 3,029,615 A * | 4/1962 | Lindsey | 62/343 |
| 3,061,281 A * | 10/1962 | Phelan et al. | 366/196 |
| 3,087,708 A | 4/1963 | Sims | |
| 3,168,296 A * | 2/1965 | Cowley | 366/65 |
| 3,292,911 A * | 12/1966 | Paul | 366/313 |
| 3,731,339 A * | 5/1973 | Addison | 15/246.5 |
| 4,095,307 A * | 6/1978 | Brubaker | 15/246.5 |
| 4,274,751 A * | 6/1981 | Rector et al. | 366/310 |
| 4,343,554 A * | 8/1982 | Tawara | 366/65 |
| 4,854,720 A * | 8/1989 | Schold | 366/294 |
| 4,887,910 A * | 12/1989 | Bravo | 366/312 |
| 5,074,125 A * | 12/1991 | Schifferly | 62/342 |
| 5,199,278 A * | 4/1993 | Cocchi | 62/343 |
| 5,421,651 A * | 6/1995 | Pickering et al. | 366/311 |
| 5,615,952 A * | 4/1997 | Cocchi | 366/313 |
| 6,220,047 B1 * | 4/2001 | Vogel et al. | 62/342 |
| 6,712,499 B2 * | 3/2004 | Fink, Jr. | 366/325.5 |
| 6,752,527 B2 * | 6/2004 | Galletti | 366/66 |
| 2006/0062078 A1 * | 3/2006 | Jejcic | 366/310 |
| 2007/0140053 A1 * | 6/2007 | Jejcic | 366/311 |

FOREIGN PATENT DOCUMENTS

| | | |
|---|---|---|
| DE | 4426589 A1 * | 2/1995 |
| EP | 0046477 A1 | 3/1982 |
| EP | 386323 A1 * | 9/1990 |
| FR | 2213092 A1 | 8/1974 |
| WO | WO 9107878 A1 * | 6/1991 |

OTHER PUBLICATIONS

Machine translation (Babelfish) of FR 2,213,092, generated Feb. 11, 2009.*

European Search Report, E4453/06-EP, Feb. 23, 2007.

* cited by examiner

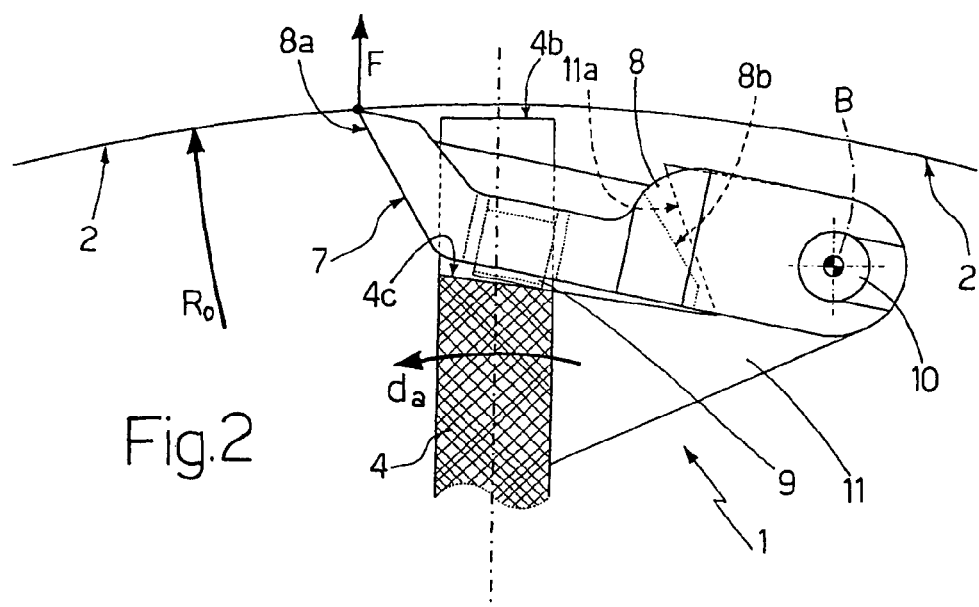
Fig.2
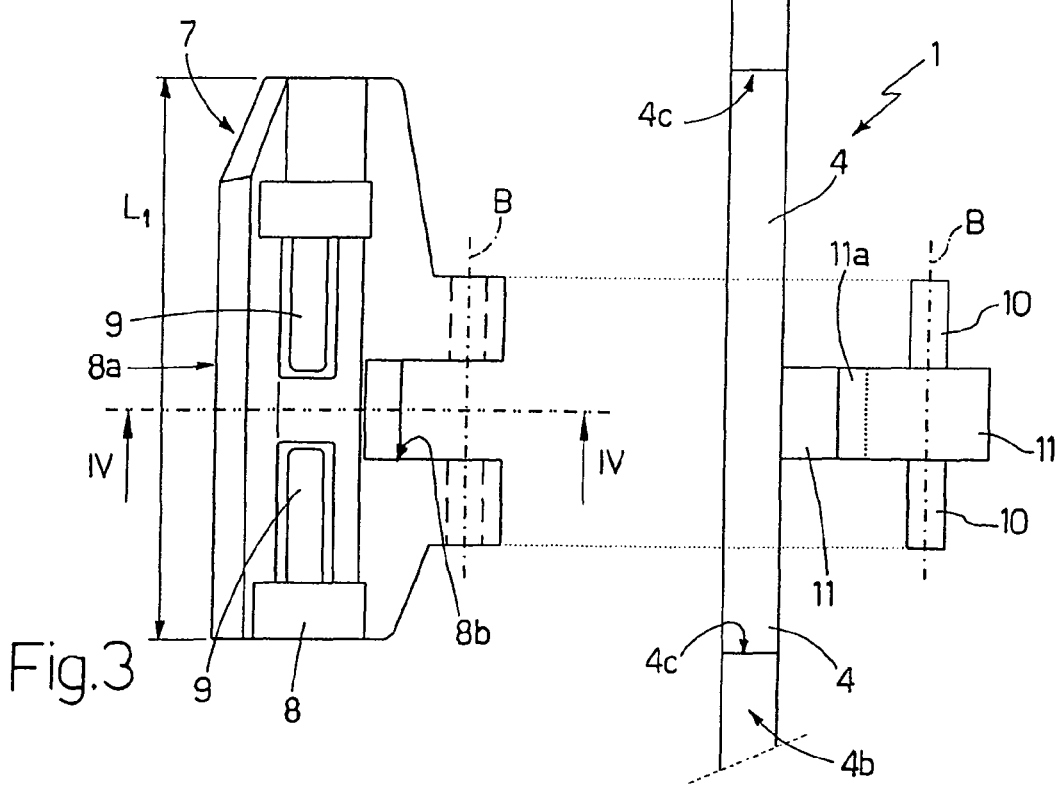
Fig.4
Fig.3

MIXING MEMBER FOR BLENDERS

The present invention relates to a mixing member for blenders.

BACKGROUND OF THE INVENTION

As is known, blenders are used for making home-made ice-cream, and normally comprise a cylindrical, horizontal-axis bowl into which the ingredients for producing a given quantity of ice-cream are poured; a cooling unit for cooling and maintaining the bowl and contents at a temperature ranging between −10° C. and −35° C.; and a rotary mixing member mounted for rotation inside the bowl to blend the ingredients at the various ice-cream-making stages.

In addition, the mixing member is shaped to uninterruptedly scrape the whole cylindrical inner surface of the bowl, to prevent the ingredient mixture inside the bowl from adhering to the lateral wall on account of the low temperature of the lateral wall.

More specifically, most currently marketed mixing members extend coaxially with a longitudinal axis, which, in use, coincides with the axis of symmetry of the bowl, and substantially comprise a number of elongated rectangular radial blades spaced angularly about the longitudinal axis of the mixing member; and two end connecting hubs, which are coaxial with the longitudinal axis of the mixing member, are located on opposite sides of the blades, and are shaped to connect the axial ends of the blades to form a rigid structure that can rotate easily about the longitudinal axis of the mixing member.

Normally, the radial blades extend helically about the longitudinal axis of the mixing member, and are angularly spaced about the axis so that the outer lateral edges of the blades lie on a cylindrical surface of a diameter approximately equal to but no larger than the diameter of the bowl; and one of the end hubs has a supporting shaft or pin projecting from the hub body, coaxially with the longitudinal axis of the mixing member, and terminating with a splined head for connection to an electric motor inside the blender.

To scrape off the ice-cream sticking to the lateral wall of the bowl, mixing members of the type described above also comprise a number of plastic scrapers fixed to the outer lateral edges of the flat blades and movable freely in the blade planes, i.e. radially; and a number of helical push springs fitted to the blades to push the individual scrapers radially outwards, so that each rests against the cylindrical inner surface of the lateral wall of the bowl.

Though highly efficient, known mixing members have the major drawback of being relatively difficult to clean, on account of the ice-cream accumulating in the cavities housing the helical springs and scrapers, with all the obvious problems this involves.

Known mixing members also have the major drawback of performing poorly when the scrapers are called upon to remove thicker and harder than normal ice-cream off the wall surface, on account, for example, of more intense cooling of the lateral wall of the bowl. In which case, the elastic force of the helical springs may not be sufficient for the scrapers to adhere to the surface of the lateral wall of the bowl.

SUMMARY OF THE INVENTION

It is an object of the present invention to provide a mixing member for blenders, designed to eliminate the aforementioned drawbacks, and which is also cheaper to produce.

According to the present invention, there is provided a mixing member for blenders, as claimed in the attached Claims.

BRIEF DESCRIPTION OF THE DRAWINGS

A non-limiting embodiment of the present invention will be described by way of example with reference to the accompanying drawings, in which:

FIG. 2 shows a side view, with parts in section and parts removed for clarity, of a portion of the FIG. 1 mixing member;

FIG. 3 shows a partly exploded front view of the FIG. 2 portion of the mixing member;

FIG. 4 shows a side view of a component part of the FIG. 3 mixing member sectioned along line IV-IV.

DETAILED DESCRIPTION OF THE INVENTION

Figure 1:
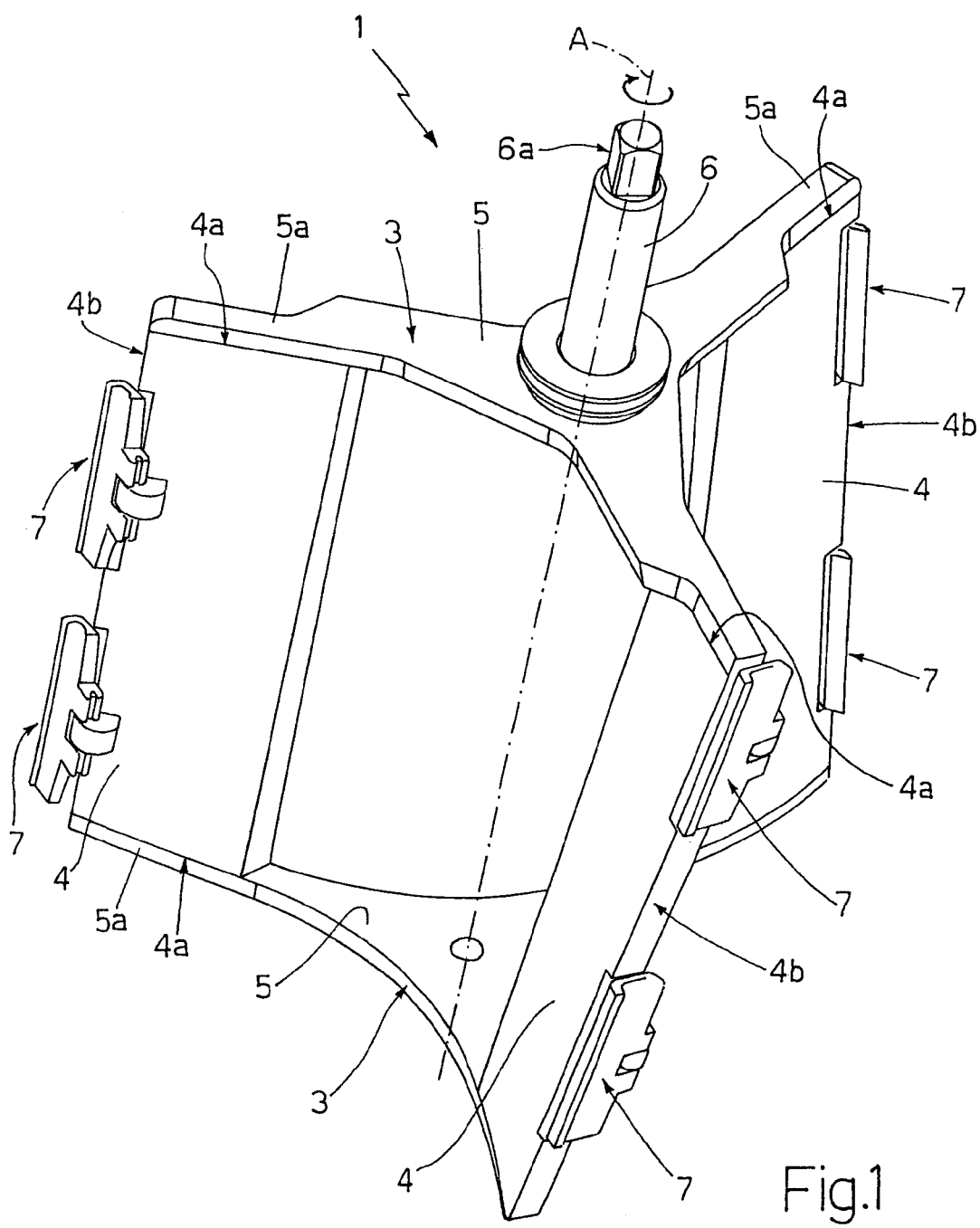
FIG. 1 shows a view in perspective of a mixing member for blenders, in accordance with the teachings of the present invention.

With reference to FIGS. 1 and 2, number 1 indicates as a whole a rotary mixing member specially designed for assembly in an axially rotating manner inside the bowl 2 of a known blender, in which bowl 2 is substantially cylindrical, with the radius of curvature $R_o$ of the inner cylindrical surface preferably, though not necessarily, ranging between 10 and 20 centimetres.

With reference to FIG. 1, mixing member 1 extends coaxially with a longitudinal axis A coinciding, in use, with the longitudinal axis of symmetry (not shown) of bowl 2, and comprises two supporting hubs 3 coaxial with longitudinal axis A and a predetermined distance apart; and a number of longitudinal blades 4, which project from one supporting hub 3 to the other, while remaining substantially parallel to longitudinal axis A of mixing member 1, and are spaced angularly about longitudinal axis A to form a "squirrel cage" structure bounded laterally by a cylindrical reference surface, which is coaxial with longitudinal axis A of mixing member 1, and has a radius of curvature smaller than the radius of curvature $R_0$ of bowl 2, to permit insertion and rotation of mixing member 1 inside bowl 2.

More specifically, in the example shown, the radius of curvature of said cylindrical reference surface is approximately equal to but no larger than the radius of curvature $R_0$ of bowl 2.

Preferably, though not necessarily, longitudinal blades 4 are spaced about longitudinal axis A of mixing member 1 so as to be equidistant from and equally spaced angularly about longitudinal axis A and so form a perfectly cylindrical "squirrel cage" structure.

With reference to FIG. 1, in the example shown, longitudinal blades 4 are three in number, and each is defined by a flat, stainless steel, elongated rectangular plate 4, the two minor lateral edges 4a of which are each fixed rigidly to a respective supporting hub 3, and which extends substantially helically about longitudinal axis A of mixing member 1, while remaining locally radial with respect to longitudinal axis A, so that one of the two major lateral edges of the plate—hereinafter also referred to as the outer lateral edge 4b of the blade—lies on said cylindrical reference surface.

In other words, longitudinal blades 4 as a whole are inscribable in a cylindrical reference surface extending coaxially with longitudinal axis A of mixing member 1, and which at the same time has a radius of curvature approximately equal to but no larger than the radius of curvature $R_0$ of bowl 2.

In the example shown, each of the two supporting hubs 3 is defined by a flat, stainless steel plate 5, which lies in a plane perpendicular to longitudinal axis A of mixing member 1, and is substantially star-shaped with a number of projecting appendixes 5a projecting radially from the central body up to the minor lateral edges 4a of longitudinal blades 4. Projecting appendixes 5a are equal in number to longitudinal blades 4, are equally spaced angularly about longitudinal axis A of mixing member 1, and are so sized that the minor lateral edges 4a of longitudinal blades 4 can each be welded to a respective projecting appendix 5a to form a rigid structure rotatable freely about longitudinal axis A of mixing member 1 inside bowl 2.

In addition, one of the two supporting hubs 3 also comprises a supporting shaft or pin 6 projecting from the centre of the corresponding flat plate 5, coaxially with longitudinal axis A of mixing member 1, and terminating with a splined head 6a for connection to an electric motor located inside the blender, directly beneath the bottom of bowl 2.

In the example shown, supporting shaft 6 is made of stainless steel like the flat plate 5 with which it is integral.

With reference to FIGS. 1, 2 and 3, mixing member 1 also comprises a number of scraping devices 7 located on outer lateral edges 4b of longitudinal blades 4, and each designed to slide uninterruptedly on the inner cylindrical surface of bowl 2 to prevent the ingredient mixture inside bowl 2 from adhering to the lateral wall of the bowl.

In the example shown, each longitudinal blade 4 has two scraping devices 7 appropriately spaced along outer lateral edge 4b.

Unlike known solutions, each scraping device 7 of mixing member 1 is substantially defined by a preferably, though not necessarily, plastic or metal scraper 8, which is hinged to the body of longitudinal blade 4 so as to project from and oscillate about an axis of rotation B locally substantially parallel to outer lateral edge 4b of longitudinal blade 4 and/or to longitudinal axis A of mixing member 1, and extends in a direction substantially tangent to the circular path traveled by outer lateral edge 4b as mixing member 1 rotates about longitudinal axis A, while remaining locally substantially perpendicular to axis B.

Scraper 8 is shaped to comprise, at a predetermined distance from axis B, a substantially straight, wedge-shaped transverse edge 8a, which is locally substantially parallel to outer lateral edge 4b of longitudinal blade 4 or to longitudinal axis A of mixing member 1, and is designed to rest on the cylindrical inner surface of bowl 2. Scraper 8 is also oriented with respect to longitudinal blade 4 so that wedge-shaped transverse edge 8a of scraper 8 precedes axis B along the circular path traveled by outer lateral edge 4b as mixing member 1 rotates about longitudinal axis A.

More specifically, in the example shown, scraper 8 extends astride the outer lateral edge 4b of longitudinal blade 4, and engages a recess or depression 4c formed in the lateral side of longitudinal blade 4, so that wedge-shaped transverse edge 8a and axis of rotation B of scraper 8 are located on opposite sides of longitudinal blade 4, with wedge-shaped transverse edge 8a preceding axis B along the circular path traveled by outer lateral edge 4b as mixing member 1 rotates about longitudinal axis A.

In other words, scraper 8 is positioned astride outer lateral edge 4b of longitudinal blade 4, so that wedge-shaped transverse edge 8a faces forwards in the travelling direction of scraping device 7 inside bowl 2.

With reference to FIGS. 2, 3 and 4, each scraping device 7 also comprises an elastic member 9 interposed between scraper 8 and the body of longitudinal blade 4, and which acts on scraper 8 to rotate it about axis B and push wedge-shaped transverse edge 8a outwards of the cylindrical reference surface of mixing member 1, i.e. onto the cylindrical inner surface of bowl 2.

In the example shown, scraper 8 is defined by a flat, substantially T-shaped plastic or metal plate 8, which has a central leg with a C-shaped end to engage, in freely rotating and easily releasable manner, a cylindrical pin 10 coaxial with axis B, and comprises, along the whole of the top crosspiece, a wedge-shaped ridge or appendix 8a defining the wedge-shaped transverse edge 8a of scraper 8. Elastic member 9 is defined by two flexible metal blades 9, which project from the top crosspiece of flat plate 8 and rest on the bottom of the recess or depression 4c formed in the lateral side of longitudinal blade 4.

Flexible metal blades 9 are designed to push the top crosspiece of flat plate 8 off the bottom of recess or depression 4c formed in the lateral side of longitudinal blade 4, and so push the wedge-shaped ridge 8a of the top crosspiece outwards of the cylindrical reference surface of mixing member 1, i.e. onto the cylindrical inner surface of bowl 2.

Cylindrical pin 10, coaxial with axis B, is located alongside recess or depression 4c formed in the lateral side of longitudinal blade 4, and is fixed rigidly to the body of longitudinal blade 4 by a supporting bracket 11 projecting from one of the two faces of longitudinal blade 4 in the opposite direction to the travelling direction $d_a$ of longitudinal blade 4.

With reference to FIGS. 2 and 3, in the example shown, supporting bracket 11 lies in a plane perpendicular to axis B, and cylindrical pin 10 extends coaxially with axis B, on opposite sides of supporting bracket 11. The body of the central leg of flat plate 8 has a central through groove 8b, which is engaged in a sliding manner by the portion of supporting bracket 11 surrounding cylindrical pin 10, so that the C-shaped end of the central leg of flat plate 8 can reach and engage cylindrical pin 10 in a freely rotating manner.

In the example shown, the portion of supporting bracket 11 engaging the central through groove 8b in the central leg of flat plate 8 has a projecting stop appendix 11a, which projects towards longitudinal blade 4, to form a groove enclosing the central leg of flat plate 8, and which establishes a predetermined maximum angle of oscillation of flat plate 8, i.e. scraper 8, with respect to the travelling direction $d_a$ of longitudinal blade 4; which travelling direction $d_a$ is locally tangent to the cylindrical reference surface of mixing member 1.

With reference to FIGS. 1 and 3, in the example shown, flat plates 8 are sized so that the length $L_1$, measured parallel to outer lateral edge 4b of longitudinal blade 4, of the wedge-shaped transverse edge 8a of each scraper 8 is smaller than the overall axial length of longitudinal blade 4, and are appropriately offset with respect to one another on outer lateral edges 4b of longitudinal blades 4, so as to be axially spaced along the whole portion of mixing member 1 immersed in bowl 2.

Operation of mixing member 1 will be clear from the foregoing description and attached drawings, with no further explanation required, except to state that elastic members 9 are able to keep the wedge-shaped transverse edge 8a of corresponding scrapers 8 resting on the cylindrical inner surface of bowl 2, and scrapers 8 are fixed to longitudinal blades 4 so that the mechanical resistance produced by the ice-cream accumulating on wedge-shaped transverse edge 8a and on the body of scraper 8 is added to the action of elastic members 9 to proportionally increase the radial force with which the wedge-shaped transverse edge 8a of scraper 8 is pushed against the wall of bowl 2.

The advantages of scraping devices 7 as described above are obvious: mixing member 1 so formed has no recesses in which the product being mixed can accumulate, and is therefore extremely easy to clean.

Furthermore, in mixing member 1, the mechanical force F pressing wedge-shaped transverse edges 8a of scrapers 8 against the cylindrical inner surface of bowl 2 increases alongside the consistency and hardness of the ice-cream accumulated upstream from scrapers 8, so that mixing member 1 provides for thoroughly cleaning the lateral wall of bowl 2 even when producing ice-cream at lower than normal temperatures, i.e. below −20° C.

Clearly, changes may be made to the rotary mixing member 1 as described and illustrated herein without, however, departing from the scope of the present invention.

The invention claimed is:

1. A mixing member for blenders, designed for assembly in axially rotating manner inside a bowl of a blender; said bowl being substantially cylindrical, and the mixing member comprising a number of longitudinal plate-like blades extending substantially parallel to a longitudinal reference axis of the mixing member and angularly spaced about said longitudinal axis to form a structure bounded laterally by a cylindrical reference surface coaxial with said longitudinal axis; at least one of said longitudinal plate-like blades having an outer lateral edge lying on said cylindrical reference surface, and the mixing member having scraping means located on said outer lateral edge so as to rest on the cylindrical inner surface of the bowl when the mixing member is inserted inside the bowl; said scraping means comprising at least one scraper which is hinged to the longitudinal plate-like blade to project from and oscillate about a rotation axis locally substantially parallel to said outer lateral edge of the longitudinal plate-like blade and/or to said longitudinal axis of the mixing member, and which extends in a direction substantially tangent to the circular path travelled by said outer lateral edge as the mixing member rotates, while remaining locally substantially perpendicular to said rotation axis; said scraper being shaped to comprise, at a predetermined distance from said rotation axis, a wedge-shaped transverse edge which is locally substantially parallel to the outer lateral edge of the plate-like longitudinal blade or to said longitudinal axis of the mixing member, and is designed to rest on the cylindrical inner surface of said bowl; the wedge-shaped transverse edge of the scraper preceding the rotation axis of the scraper along the circular path travelled by the outer lateral edge as the mixing member rotates about said longitudinal axis; wherein said scraper extends astride the outer lateral edge of the longitudinal blade, so that the wedge-shaped transverse edge of the scraper and the rotation axis of the scraper are located on opposite sides of the longitudinal blade, and the outer edge of said longitudinal plate-like blade has a recess or depression which is engaged by said scraper.

2. A mixing member as claimed in claim 1, wherein said scraping means also comprise an elastic member, which acts on said scraper to rotate it about said rotation axis and to push the wedge-shaped transverse edge of said scraper outwards of said cylindrical reference surface of the mixing member.

3. A mixing member as claimed in claim 1, wherein the scraper is defined by a substantially T-shaped flat plate, a central leg of which is connected at an end to the body of said longitudinal plate-like blade to rotate freely about said rotation axis, and a top crosspiece of which has a wedge-shaped ridge or appendix defining the wedge-shaped transverse edge of the scraper.

4. A mixing member as claimed in claim 3, wherein an end of the central leg of said flat plate is shaped to engage, in an easily releasable manner, a cylindrical pin extending parallel to said rotation axis.

5. A mixing member as claimed in claim 4, wherein the cylindrical pin is rigidly fixed to the body of said longitudinal plate-like blade by a supporting bracket projecting from one of two faces of the longitudinal plate-like blade in an opposite direction to a traveling direction of the longitudinal plate-like blade.

6. A mixing member as claimed in claim 3, further comprising an elastic member including at least one flexible metal blade, which projects from the top crosspiece of said T-shaped flat plate and rests on a bottom of the recess or depression formed in the outer lateral edge of said longitudinal plate-like blade.

7. A mixing member as claimed in claim 1, wherein said scraper is made of plastic or metal.

8. A mixing member as claimed in claim 1, wherein each said longitudinal plate-like blade is defined by an elongated rectangular flat plate, which extends substantially helically about the longitudinal axis of the mixing member, while remaining locally radial with respect to the longitudinal axis.

9. A mixing member as claimed in claim 1, wherein the radius of curvature of said cylindrical reference surface is approximately equal to but no larger than the radius of curvature of the cylindrical inner surface of said bowl.

10. A mixing member as claimed in claim 1, wherein said scraping means further comprises an elastic member, which acts on said scraper to rotate it about said rotation axis and pushes the wedge-shaped transverse edge of said scraper outwards of said cylindrical reference surface of the mixing member.

\* \* \* \* \*